UNITED STATES PATENT OFFICE.

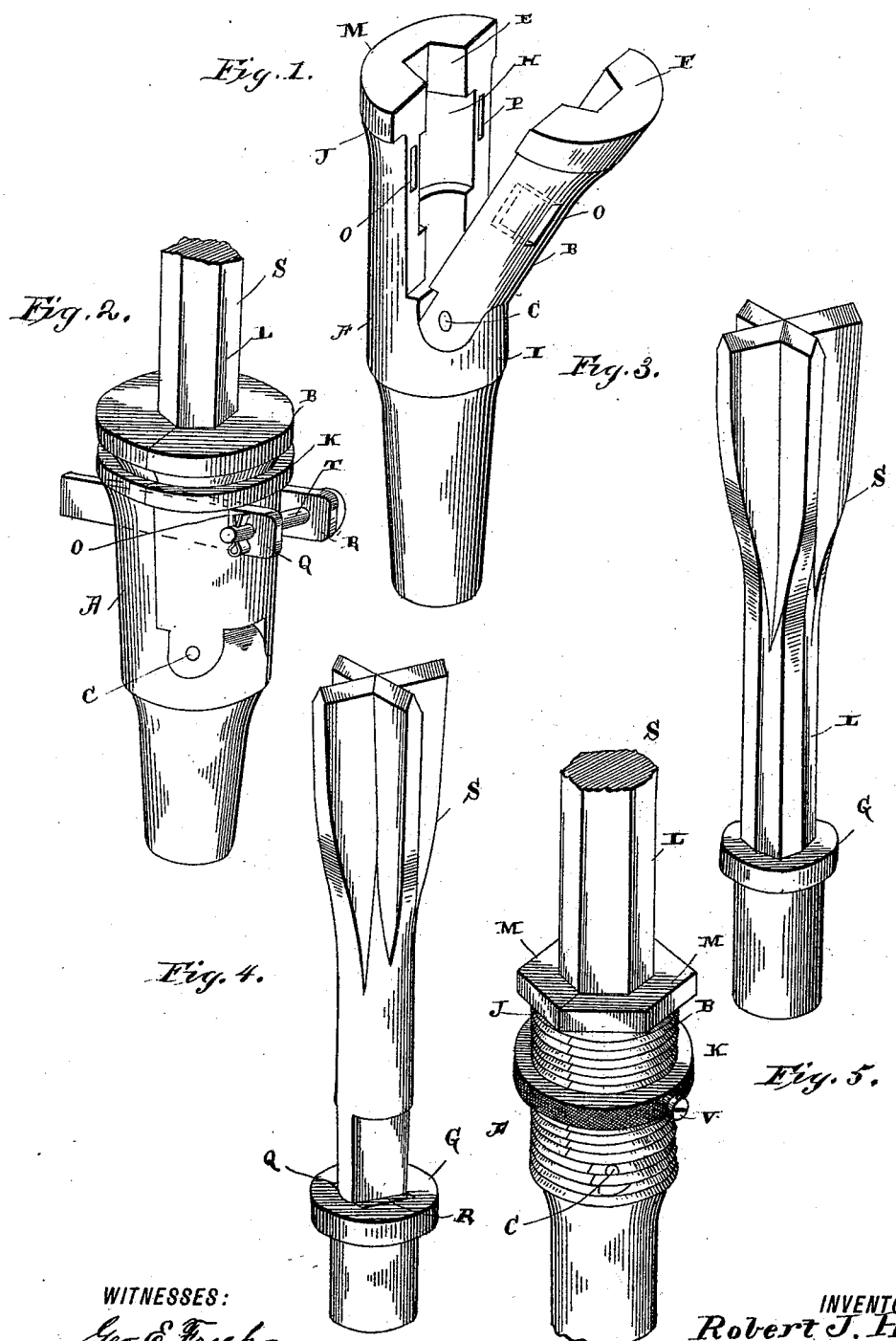

ROBERT J. HOLLAND, OF NEVADA, CALIFORNIA.

DRILL-CHUCK.

SPECIFICATION forming part of Letters Patent No. 519,454, dated May 8, 1894.

Application filed August 19, 1892. Renewed February 27, 1894. Serial No. 501,727. (No model.)

*To all whom it may concern:*

Be it known that I, ROBERT J. HOLLAND, of Nevada city, in the county of Nevada and State of California, have invented certain new and useful Improvements in Drill-Chucks; and I do hereby declare the following to be a full, clear, and exact description of the invention, such as will enable others skilled in the art to which it appertains to make and use the same.

My invention relates to improvements in drill-chucks and its object is to provide a very simple and effective drill chuck in which it is almost impossible for a drill to slip or turn.

My invention more particularly resides in the novel construction, combination and arrangement of parts hereinafter fully specified and pointed out in the claims.

In the accompanying drawings, Figure 1 is a perspective view of the chuck, with its hinged side open to receive the drill. Fig. 2 is a perspective view of the chuck with the drill inserted. Fig. 3 is a perspective view of a drill, the cross-section of whose shank is a polygon. Fig. 4 is a perspective view of a drill the cross-section of whose shank is circular, and Fig. 5 is a modification.

A is the main body of the chuck and B is the hinged portion pivoted to A by means of the pivot C. The portions A and B have each a groove E, F on their inner surfaces in which the shank of the drill is placed, and the center of said groove is enlarged or cut deeper to admit the shoulder G.

The main body of the chuck is somewhat cone-shaped in form, the diameter at I being less than its diameter at J, so that when a metallic ring K is slipped from I toward J it binds or holds the parts A and B of the chuck, firmly together.

When the drill (Fig. 3) is placed in the chuck, the shoulder G rests in the recess H, and the shank L rests in the groove E. The hinged part B of this chuck is then closed, as shown in Fig. 2, and the ring K is then passed over the chuck and forced up as near the shoulder M as possible. Two rectangular holes P O pass through the parts A, B, one on either side of the slot E F. When the ring or band K is forced upward, and binds the two parts A and B of the chuck firmly together, wedges Q, R, are driven into the rectangular holes P, O and under the ring K, thus preventing said ring from slipping toward the smaller portion of the chuck.

It is easily seen that the drill, the cross-section of whose shank is a polygon, cannot possibly turn in the chuck when the jaws A, B are closed. The drill is prevented from slipping out of the chuck by the shoulder G. The wedges Q R are secured in the rectangular holes O P by the pin T which passes through the small ends of the wedges and is fastened by the split pin U. The drill represented in Fig. 4 is planed off flat on opposite sides to allow the wedges Q R to pass through the chuck, and also to prevent the drill from turning.

In Fig. 5 the outer surface of the chuck is threaded, and the ring K has corresponding threads on its inner surface. In this modification the drill is inserted in the manner explained above and the ring screwed up toward the top J of the chuck until the parts A, B, press firmly about the drill, and then held in place or prevented from turning by the screw V.

Having thus fully described my invention, what I claim, and desire to secure by Letters Patent, is—

1. A drill chuck consisting of two parts, one of which is hinged to the other and both of which are formed with an interior groove enlarged at the center and adapted to align when the parts are closed, the mouth of the united groove of the two parts being polygonal in shape, and of less diameter than the remaining portion of the groove, a drill, having a shoulder, and a shank of polygonal form, which is grasped by the said polygonal mouth of the groove to prevent the said drill from turning, and means for holding the two parts closed, substantially as described.

2. In a drill chuck, the combination of two parts, one of which is hinged to the other and both formed with inner opposing grooves enlarged at the center and adapted to align with each other, the said parts being also formed with rectangular transverse holes on opposite sides of the said grooves, a pair of wedges removably fitted in said holes, and a transverse fastening for said wedges, substantially as described.

In testimony whereof I have signed this specification in the presence of two subscribing witnesses.

ROBERT J. HOLLAND.

Witnesses:
JOHN C. NILON,
FRANK T. NILON.